US008665733B2

(12) United States Patent
Eskicioglu et al.

(10) Patent No.: US 8,665,733 B2
(45) Date of Patent: Mar. 4, 2014

(54) METHOD AND APPARATUS FOR ROUND TRIP DELAY KPI MONITORING IN LIVE NETWORK USING USER PLANE PROBE SESSION

(75) Inventors: Suat R. Eskicioglu, Ottawa (CA); Nausheen Naz, Ottawa (CA)

(73) Assignee: Alcatel Lucent, Paris (FR)

( * ) Notice: Subject to any disclaimer, the term of this patent is extended or adjusted under 35 U.S.C. 154(b) by 77 days.

(21) Appl. No.: 13/250,205

(22) Filed: Sep. 30, 2011

(65) Prior Publication Data

US 2013/0086250 A1    Apr. 4, 2013

(51) Int. Cl.
*H04L 12/26* (2006.01)
*G06F 15/173* (2006.01)

(52) U.S. Cl.
USPC ............................ 370/249; 370/241; 709/223

(58) Field of Classification Search
USPC .................. 709/223, 228; 370/252, 241, 249
See application file for complete search history.

(56) References Cited

U.S. PATENT DOCUMENTS

| | | | | |
|---|---|---|---|---|
| 6,370,572 B1 * | 4/2002 | Lindskog et al. | ............. | 709/223 |
| 6,694,369 B1 * | 2/2004 | Vepa et al. | .................... | 709/228 |
| 7,606,887 B1 * | 10/2009 | Stewart et al. | ................ | 709/223 |
| 7,894,356 B2 * | 2/2011 | Mottishaw et al. | ........... | 370/252 |
| 7,983,691 B1 * | 7/2011 | Wong et al. | ................. | 455/456.1 |
| 7,987,257 B1 * | 7/2011 | Stewart et al. | ................ | 709/223 |
| 2005/0157705 A1 * | 7/2005 | Galetto et al. | ................ | 370/352 |
| 2006/0153091 A1 * | 7/2006 | Lin et al. | ........................ | 370/252 |
| 2006/0159112 A1 * | 7/2006 | Sundaram et al. | ............ | 370/412 |
| 2007/0147258 A1 * | 6/2007 | Mottishaw et al. | ........... | 370/241 |
| 2009/0190482 A1 * | 7/2009 | Blair | ............................ | 370/250 |

* cited by examiner

*Primary Examiner* — Lynn Feild
*Assistant Examiner* — Michael A Chambers
(74) *Attorney, Agent, or Firm* — Kamer & Amado, P.C.

(57) ABSTRACT

A method and apparatus for Round Trip Delay KPI Monitoring in a live network using a user plane probe session is disclosed for measuring round trip delays in a manner that allows latency to be apportioned to network elements. The method and apparatus for Round Trip Delay KPI Monitoring in a live network using a user plane probe session includes transmitting a loopback packet containing a probe session indicator and capturing timestamps of arrival and departure times at each network element traversed by the loopback packet, and then transmitting the timestamps to a Network Management System.

20 Claims, 13 Drawing Sheets

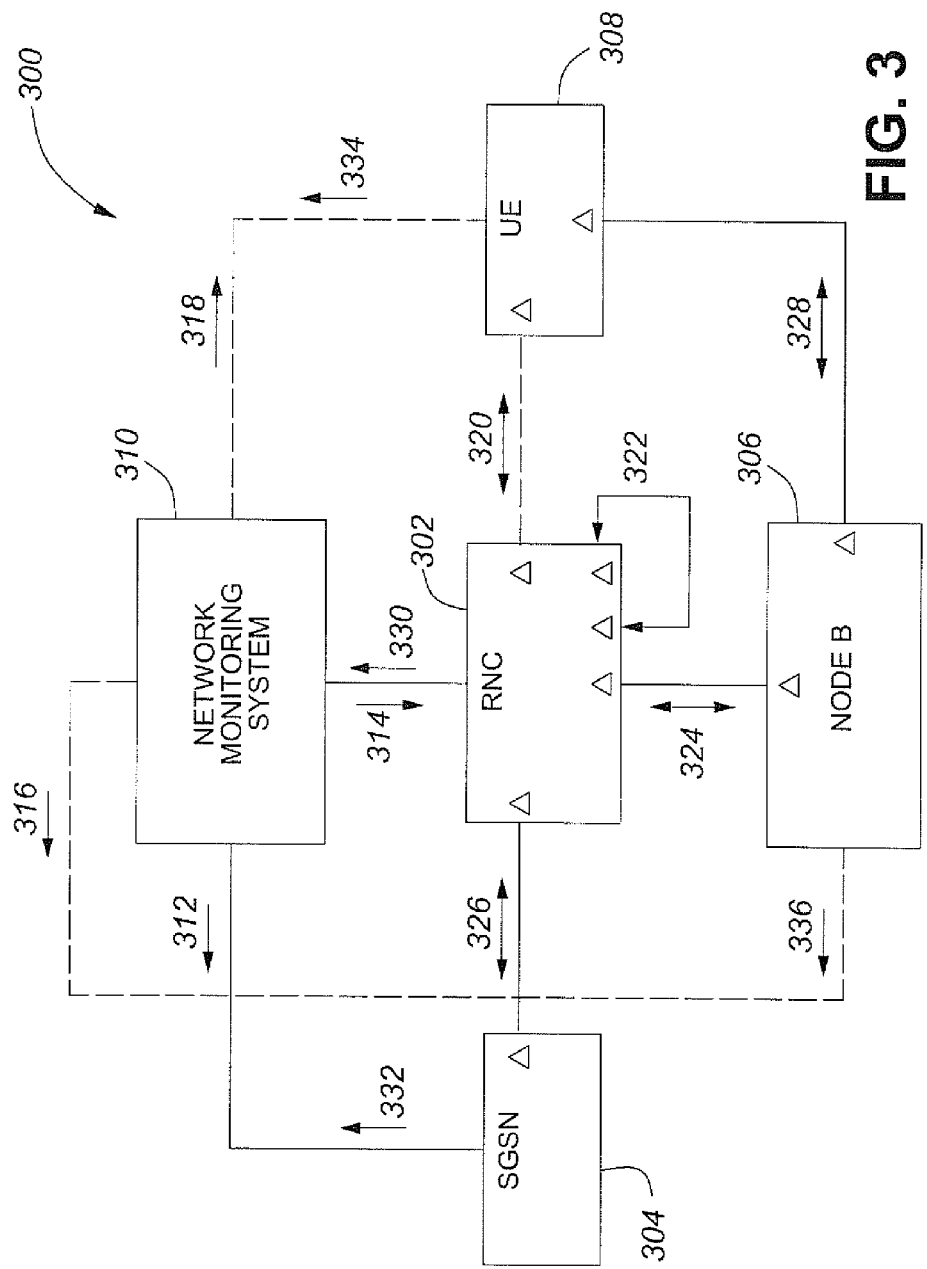

METHOD AND APPARATUS FOR ROUND TRIP DELAY KPI MONITORING IN LIVE NETWORK USING USER PLANE PROBE SESSION

FIELD OF THE INVENTION

The invention relates to generally to key performance indicators in communication networks and is particularly related to network element delay apportionment in round trip delay monitoring.

BACKGROUND OF THE INVENTION

The quality of end user experience in Wireless Networks is of great importance for the Network Operators because it is one of the elements that attracts and keeps subscribers and builds customer loyalty. For that reason, all wireless network operators track the network performance indicators and demand from the infrastructure and mobile vendors that certain performance criteria are met to satisfy a level of quality of the end user experience. The various metrics measuring the performance of the network are generally called Key Performance Indicators (KPI).

For tracking reasons, the KPIs can be grouped under three separate categories.

The first types of indicators are the ones tracking the availability or continuity of end user services, such as, success rates or retainability rates.

The second type of indicators track the response time in establishing services for the end user. These are termed as Signaling Plane Delay KPIs.

The third type is specific for data traffic to monitor round trip delay and throughput of the established Radio Access Bearer (RAB). These KPIs are termed as Data Path KPIs.

Even though it is feasible to measure the total data path latency for any given user and for any given service, it is in current practice prohibitively expensive to measure the apportionment of this total delay, since many network elements, end user equipments and transport network elements contribute to this delay. When an end-to-end data path delay is within an expected range, knowledge of specific element latencies are of academic interest with a possible use of longer term optimization of network element latencies. When the measured end-to-end latency is higher than the expected value, it is a matter of urgency to know which of the network elements are the causes of this extra delay.

FIG. 1 illustrates a simplified UMTS (Universal Mobile Telecommunications System) network 100, having network elements Radio Network Controller (RNC) 102, Serving GPRS Support Node (SGSN) 104, NodeB (base station transceiver) 106, and User Equipment (UE) 108, all supervised by a Network Monitoring system 110. Physical connections are represented by solid lines between network elements, and application layer connections are represented by dashed lines between network elements. Network Protocol Analyzers 112A, 112B, 112C are installed at the interfaces between these nodes in order to capture message packets and log the time at which they are captured. In operational telecommunications networks with hundreds of nodes and thousands of users, the scaling of this approach becomes very impractical. In addition, this approach presumes that the Network Protocol Analyzers can decode the captured packets so as to associate a time stamp with a particular user and/or service. This presumption becomes problematic if the packets are encrypted.

Therefore, it would be desirable to have a method or apparatus capable of measuring round trip delay and apportioning latency among network elements contributing to the round trip delay without the drawbacks of present methods.

SUMMARY OF THE INVENTION

It is an object of the invention to provide a method and apparatus of delay apportionment among network elements for a round trip message.

According to an aspect of the invention there is provided a method for apportioning delays of a plurality of network elements on a round trip path in a network, the method having the steps of first, transmitting a loopback message having a probe session indicator along the round trip path; then determining at each of the plurality of network elements on the round trip path the presence of the probe session indicator, and responsive to the presence of the probe session indicator, logging a first timestamp corresponding to the time of receipt of the loopback message, and a second timestamp corresponding to the time of retransmission of the loopback message; and subsequently transmitting at each of the plurality of network elements the first and second timestamps to a network management system.

In some embodiments of the invention the determining the presence of the probe session indicator occurs in an application layer of the network element.

In some embodiments the indicator has an International Mobile Subscriber Identity (IMSI) identifying a probe session while in other embodiments the probe session indicator consists of a probe bit identifying a probe session.

Advantageously, in some of the latter embodiments the probe bit consists of a bit in a message header of the loopback message.

In another alternative embodiment the loopback message comprises a modified IMCP PING message.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which:

FIG. 3 illustrates probe session messaging in a network according to a first embodiment of the present invention;

In the figures, like features are denoted by like reference characters.

DETAILED DESCRIPTION

The following portion of this description focuses on the Signaling Plane Delay Key Performance Indicator (KPI). Signaling Plane Delay KPI measures or monitors the response time in setting up a service for an end user. It is relatively straight forward to measure the total latency for any given user and for any given service on a network, it has been heretofore prohibitively expensive to determine the apportionment of this total delay, since many network elements, end user equipment and transport network elements contribute to this delay. When the end-to-end delay is within the expected range, there is no need to know which of the elements are contributing how much to the total latency, but when the measured end-to-end latency is higher than the expected value, it is important to know which elements in the network are contributing to the excess delay in order to take appropriate remedial action to resolve the problem.

Examples of Signaling Plane Delay include the delay endured by a User Equipment (UE) to setup a Radio Resource Control (RRC) connection in a Universal Mobile Telecommunications System (UMTS) network, or the procedure delay in adding or deleting the radio links during hand-off procedures when a UE moves between radio cells.

In telecommunications networks, signaling plane messages are transmitted from a first node to a second node to establish services. In some cases, these messages are relayed via one or more intermediate nodes. In other cases, receipt of a first message at a node triggers transmission of a related message in a message sequence to set up a service or perform some other function in the network. Signaling plane messages take a finite time to traverse each node, referred to as signaling plane delay. In order to monitor or measure a signaling plane delay KPI, it is useful to determine the time when the message arrives and leaves strategic trace points in the network. Typically it is useful to record a timestamp at reception of a message and record another timestamp upon forwarding the message to a subsequent node or upon transmission of a related message in a message sequence. The difference between send time and receive time gives the message delay incurred at a particular node.

Measuring this message delay is conceptually quite simple but presents challenges in implementation. When a message arrives at a network element or node, it actually arrives at the hardware layer, where there is not yet knowledge of message type or call type, which is determined by parsing of the message which is typically performed in software. Trace points at the hardware layer is CPU intensive because logging of time stamps would need to be performed for every message. This would also result in complex post-processing scripts as well, in order to handle the very large number of resulting timestamps to sort and analyze.

Figure 1:
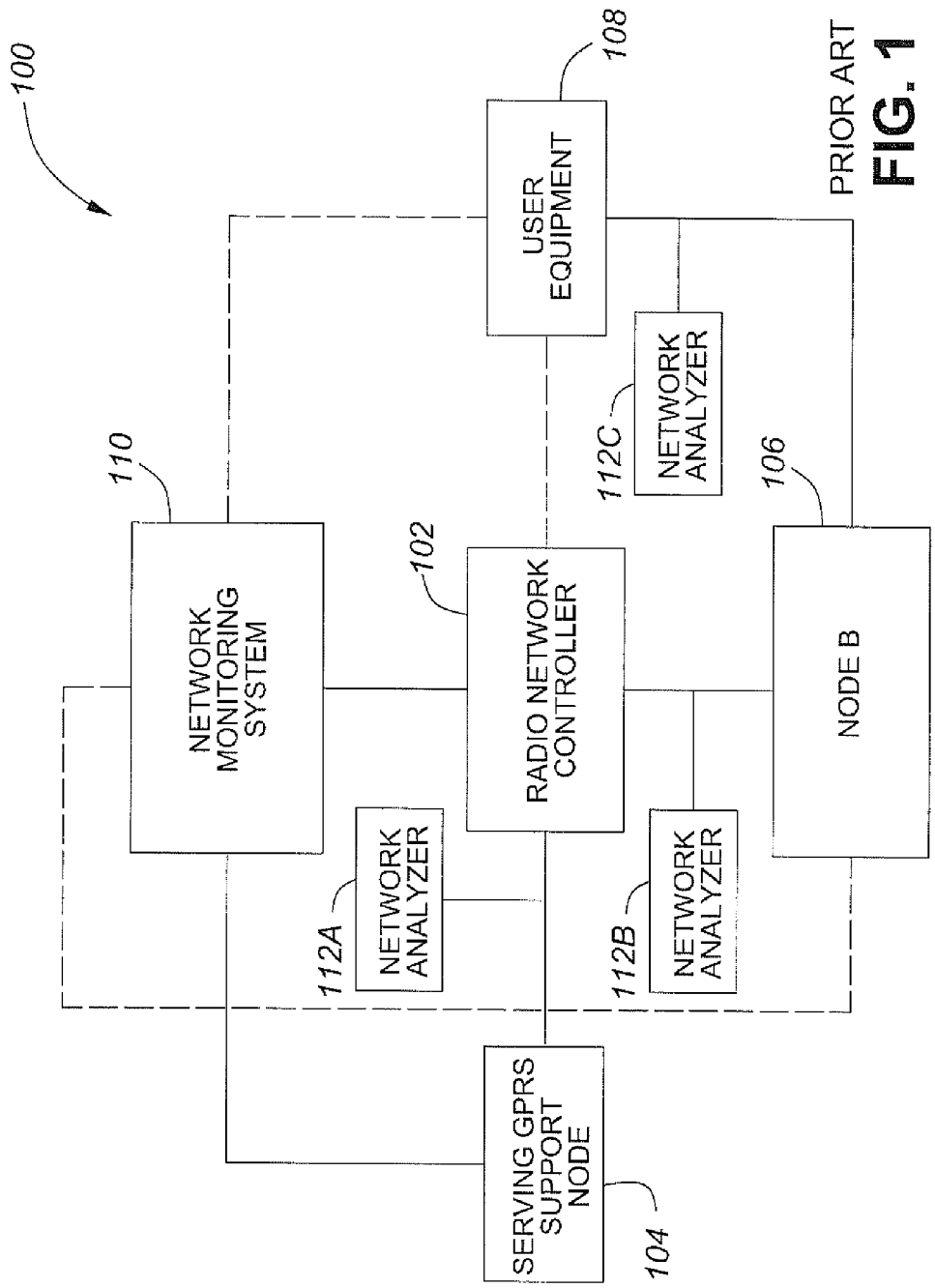
FIG. 1 illustrates a simplified UMTS network with external network analyzers for determining the source of network latency according to the prior art.
Figure 2:
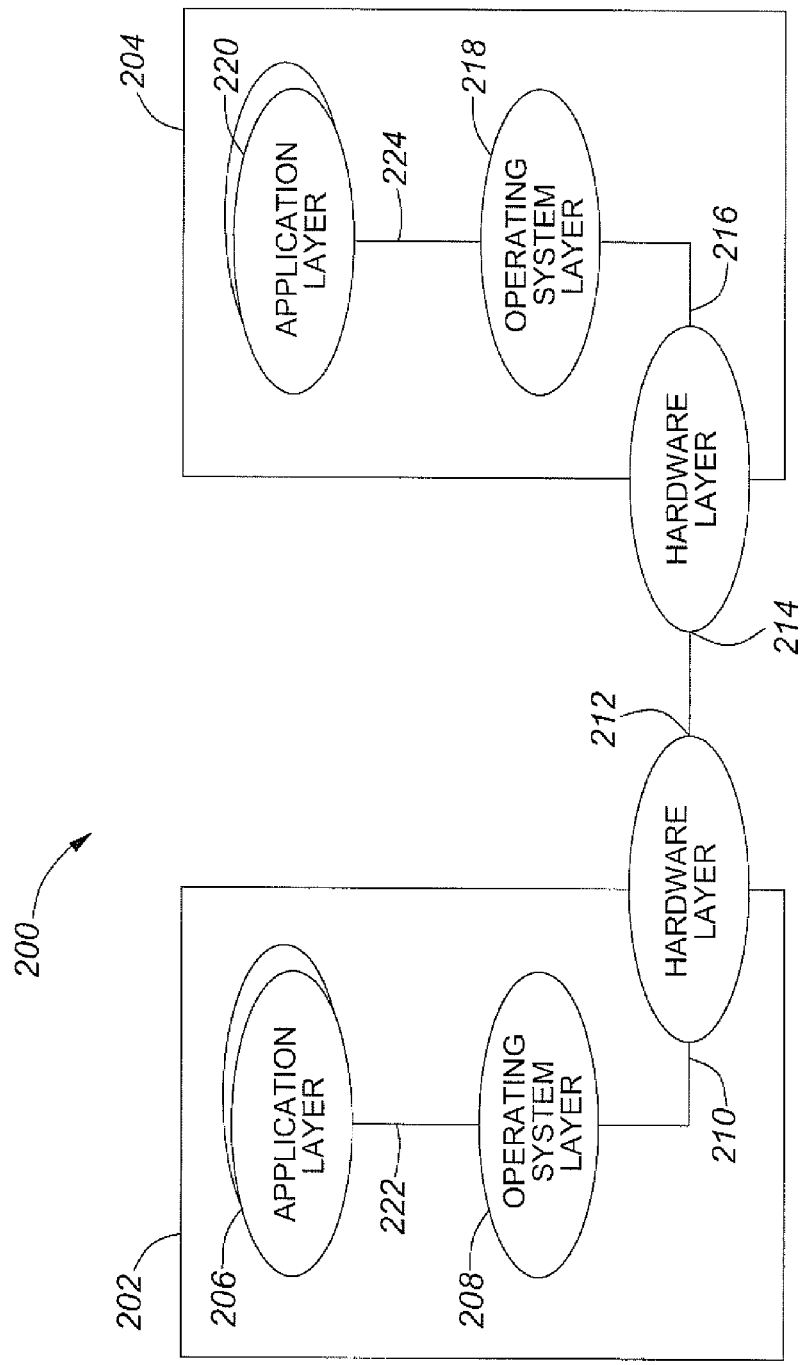
FIG. 2 illustrates message flow between network elements.

FIG. 2 illustrates message flow between two nodes 202, 204 of network 200. Typically, in prior art systems, Platform delay is measured from point 208 to point 212 on node 202 and between point 218 to point 214 on node 204. It is difficult from a practical point of view to measure without any performance impact a packet leaving point 212 because point 212 is common to all messages within node 202 and therefore requires timestamping all packets received at or transmitted from node 202.

Using trace points in a software application layer can potentially introduce some additional processing delay and cause some minor loss of accuracy. In order to perform latency measurements while minimizing impact to system performance, it is possible to divide the delay into:

1. Platform Delay (Operating System and Hardware layer): the delay between two interacting applications sending/receiving a message, such as between point 222 and point 224.

2. Application Delay (Application layer): the time spent by a message inside the application module. That is the duration for which applications receives a request and send the response back A proposed solution includes setting trace points at points 222 and 224, above the hardware layer 210, 216 and just below the Application layer 206, 220 to track incoming and outgoing messages on all nodes or network elements 202, 204. At this point the message type and message identifier can be determined so that time-stamping of messages and resulting KPI monitoring can be restricted to specific messages or calls.

In order to select which messages to monitor, a probe session or probe call is defined. Thus, when a network operator wishes to monitor signaling plane delay in a communication network, the network operator initiates a probe session having a probe session indicator. Signaling plane messages are propagated through various network elements during the regular process of setting up a session. At each of the network elements, the signaling plane messages for this probe session are detected and for these messages only, the time of receiving the message is recorded thereby creating a timestamp, and the time stamp and the associated probe session identifier are logged at the respective network element. The logged timestamps and identifiers are then forwarded to a network management system preferably with an identifier of the network element. The network management system sorts the timestamps and calculates signaling plane delays across each network element. Thus embodiments of the present invention collect and forward timestamp information to a network management system to facilitate the network management system to calculate signaling plane KPIs.

Application layer messages are parsed to determine if they are associated with a probe session indicator and if they are, a time stamp is recorded, capturing the time at which the message is determined to be received at the network element. In this manner, only a small subset of signaling plane messages are time-stamped and logged, which minimizes degradation in network performance.

In a first embodiment of the present invention, a probe session is defined by a predetermined specific user identifier such as an International Mobile Subscriber Identity (IMSI). Networks elements are configured with a specific user identifier labeled as a probe session identifier. In FIG. 3, physical connections are represented by solid lines between network elements and application layer connections are represented by dashed lines between network elements. Network monitoring system 310 within network 300 broadcasts a message 312, 314, 316, 318 to all network elements 302, 304, 306, 308, identifying a specific IMSI identifier as a probe session identifier which is then stored by each network element for future reference. The network elements 302, 304, 306, 308 are now configured to compare the IMSI value of incoming messages against the stored probe session IMSI.

When it is desired to measure signaling plane delays in the network 300, a session is set up using the probe session identifier. The session can include setting up any of a variety of different services including a call. As signaling messages 320, 322, 324, 326, 328 are received at each network element 302, 304, 306, 308, enabled by the broadcast message, each network element parses the incoming message to read the IMSI and compares the IMSI of the message to the specified probe session identifier to determine if they match and if so then the message is tagged as a probe session message and the time of receipt of the message is measured and stored as a timestamp at the network element along with the IMSI identifier for the probe session. Note that the time of receipt of the message is more accurately characterized as the time at which the message has been identified as containing an IMSI probe session identifier. The points where send or receive timestamps are recorded are indicated by "Δ". The stored timestamps and associated session identifiers are subsequently forwarded by each network element as messages 330, 332, 334, 336 to the network monitoring system 310 for further processing.

Figure 4A:
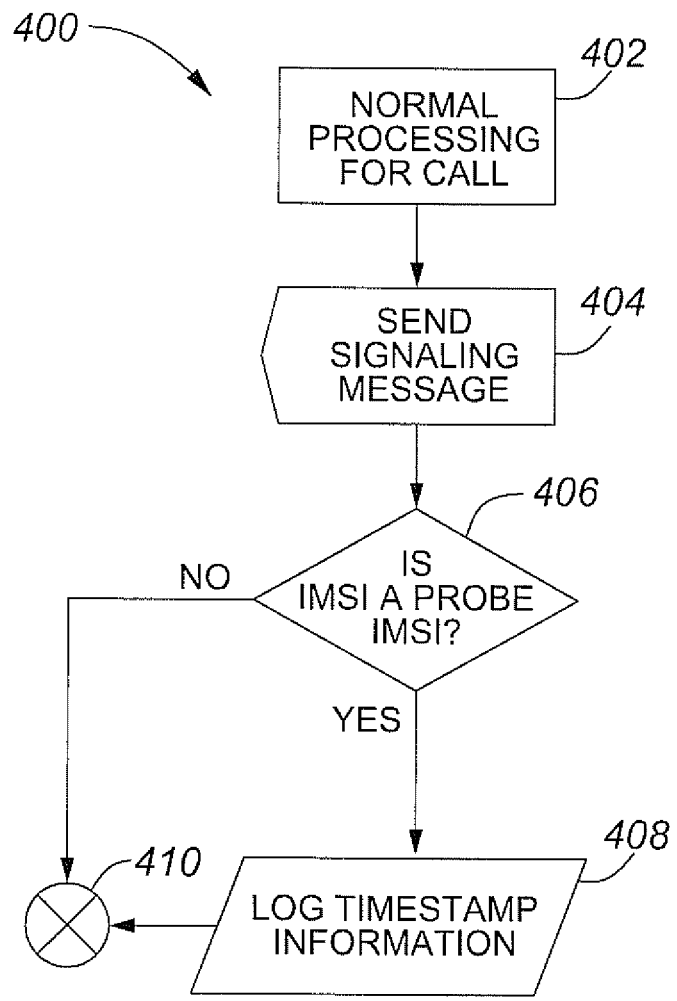
FIGS. 4A, 4B illustrate flow chart of probe session messaging according to a first embodiment of the present invention.

FIG. 4A illustrates a flowchart for transmitting signaling messages from network elements according to a first embodiment of the present invention. As signaling messages are processed for transmission from each of network elements 302, 304, 306, 308, normal call processing takes place (step 402). After a signaling message is transmitted (step 404), the network element then determines at step 406 if the IMSI associated with the message matches an IMSI associated with a probe session and if so, at step 408, the network element logs timestamp information by calculating and then saving or recording the time of transmission of the signaling message. If the IMSI is not associated with a probe session, the process stops at step 410.

Figure 4B:
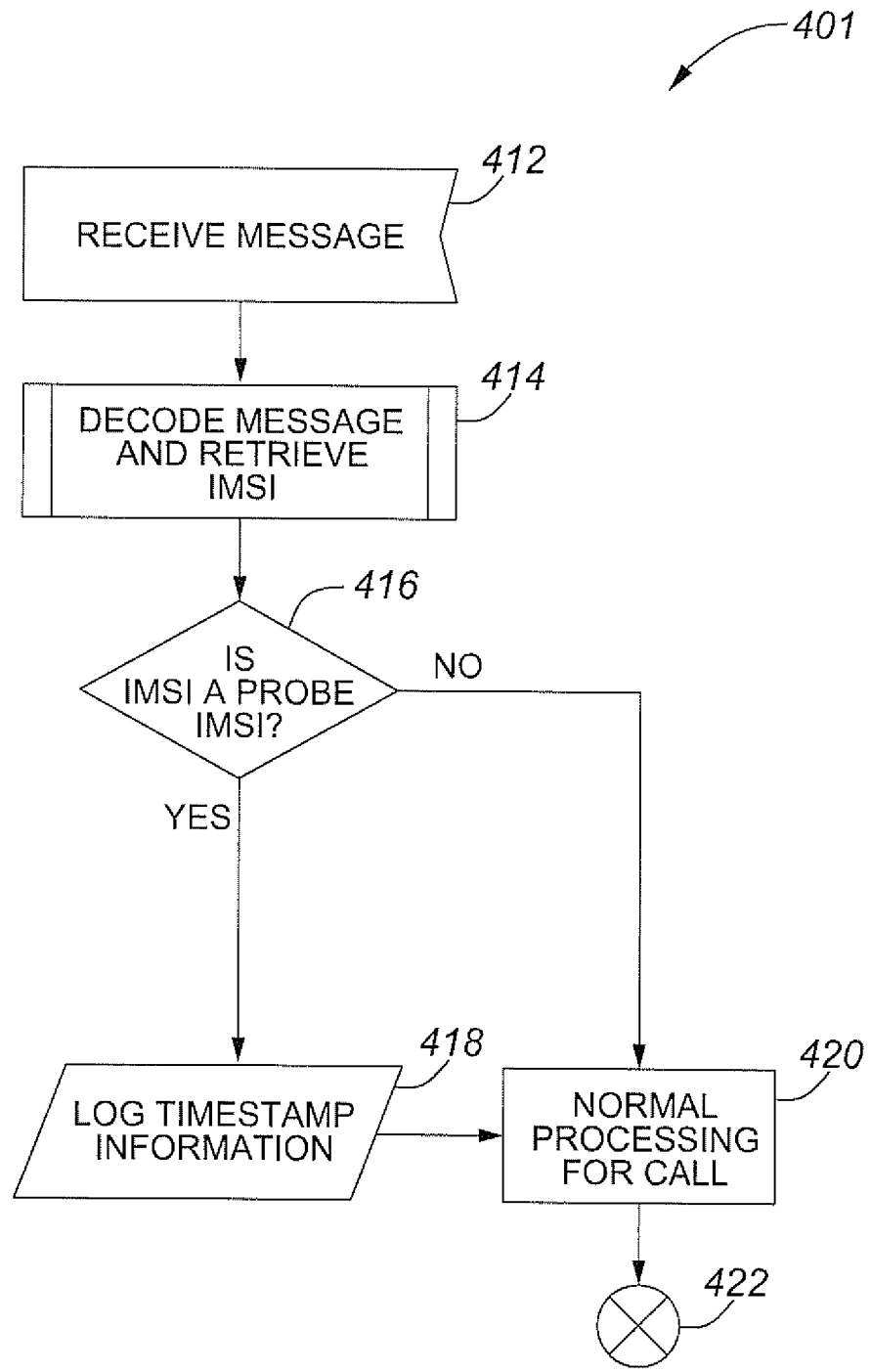

FIG. 4B illustrates a flowchart for receiving signaling messages at network elements according to a first embodiment of the present invention. The process starts at step 412 where a signaling message is received at a network element. At step 414, the network element decodes or parses the signaling message to retrieve the IMSI or other session identifier for the message. At step 416, the network element determines if the IMSI is associated with a probe session and if so, the network element logs timestamp information by calculating and then saving or recording the time of reception of the signaling message. The process then proceeds to step 420 where normal call processing continues and the process ends at step 422. If the network element determines at step 416 that the IMSI is not associated with a probe session, the process proceeds to step 420.

Each outgoing signaling message from each network element is similarly parsed to determine if it contains an IMSI defined as a probe session IMSI and if so, the transmit time of the outgoing message is measured and stored as a timestamp at the network element along with the IMSI identifier for the message. The stored timestamps and associated session identifiers are subsequently forwarded by each network element to the network monitoring system 310 where the time stamps for incoming messages and outgoing messages and their respective associated session identifiers at each network element are sorted and analyzed to calculate signaling plane delay across the various network elements in the network.

Note that signaling messages can be transmitted directly from one network element to another network element or forwarded through one or more intermediate nodes to a destination node. In either case when an outgoing message is prepared for transmission at each network element, it is parsed to determine the IMSI and compared to the predefined probe session identifier as described above.

As additional messages related to the same session, (i.e.: having the same IMSI) are generated by the network elements as part of the standard signaling sequence, they are also parsed to determine the IMSI and compared to the predefined probe session identifier as described above.

Note that more than one probe session IMSI can be defined at one time on a network element, thus IMSI values of signaling messages can be compared to a single predefined probe session identifier or against a list of predefined probe session identifiers to determine if the signaling message is associated with a probe session.

Figure 5:
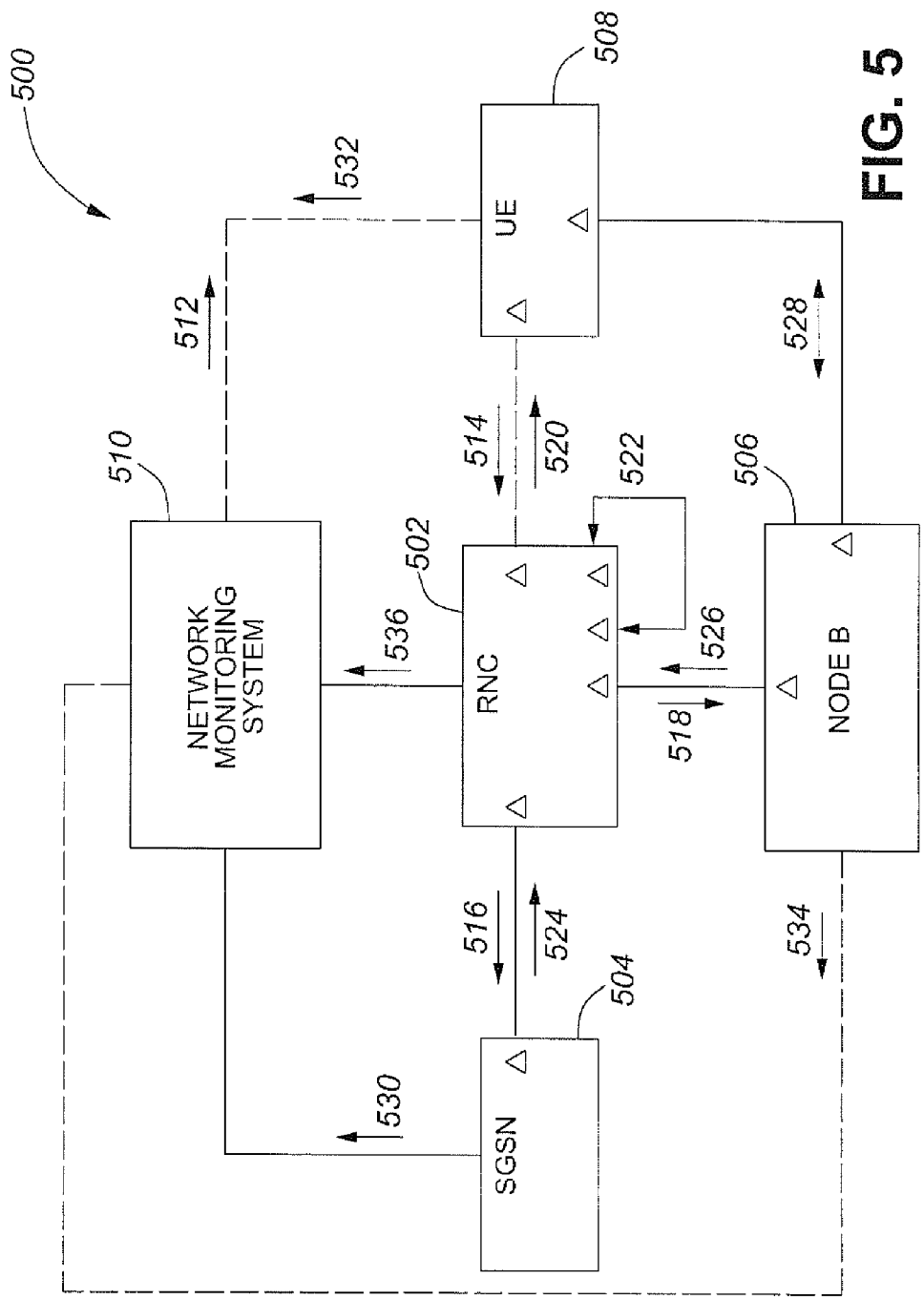
FIG. 5 illustrates probe session messaging in a network according to a second embodiment of the present invention.

Alternatively, in a second embodiment of the present invention, a User Equipment sets a specific bit within a signaling message to indicate a probe session to other network elements in the network. With reference to FIG. 5, network monitoring system 510 within network 500 transmits signaling message 512 with an IMSI identifying a specific User Equipment (UE) to UE 508, instructing UE 508 to enable a probe session indicator bit in subsequent signaling messages from UE 508.

Subsequently, when UE 508 sends signaling messages, such as for setting up a call or establishing a service, UE 508 sets a bit in the header of the signaling message 514 indicating that the message is related to a probe session. The probe session indicator bit is then propagated in related messages 516, 518, 520, 522, 524, 526, 528 to other network elements 502, 504, 506, 508 in network 500.

For example, in a UMTS network, a call setup initiated by UE 508 starts with RRC connection request message 514 from UE 508 to RNC 502. RRC Connection Request message 514 has an optional Information Element (IE) for probe indication, which will be set by the UE 508. RNC 502, upon receiving message 514 stores the information about probe in the context for the call and communicates it to SGSN 504 via signaling message 516. In this scheme, NodeB 506 receives the probe information via NBAP RL setup request message 518. Thus the network elements in network 500 receive signaling messages with the probe session bit in the signaling message header, store the probe information in the call context and pass it on upon first interaction to other interacting nodes. When network elements 502, 504, 506, 508 send or receive signaling messages with the probe session bit set, the network elements measure and store the time of receipt or transmission respectively, of the message as a timestamp at the network element along with an identifier for the probe session. The stored timestamps and associated probe session identifiers are subsequently forwarded by each network element as messages 530, 532, 534, 536 to the network monitoring system 510 for further processing.

Figure 6A:
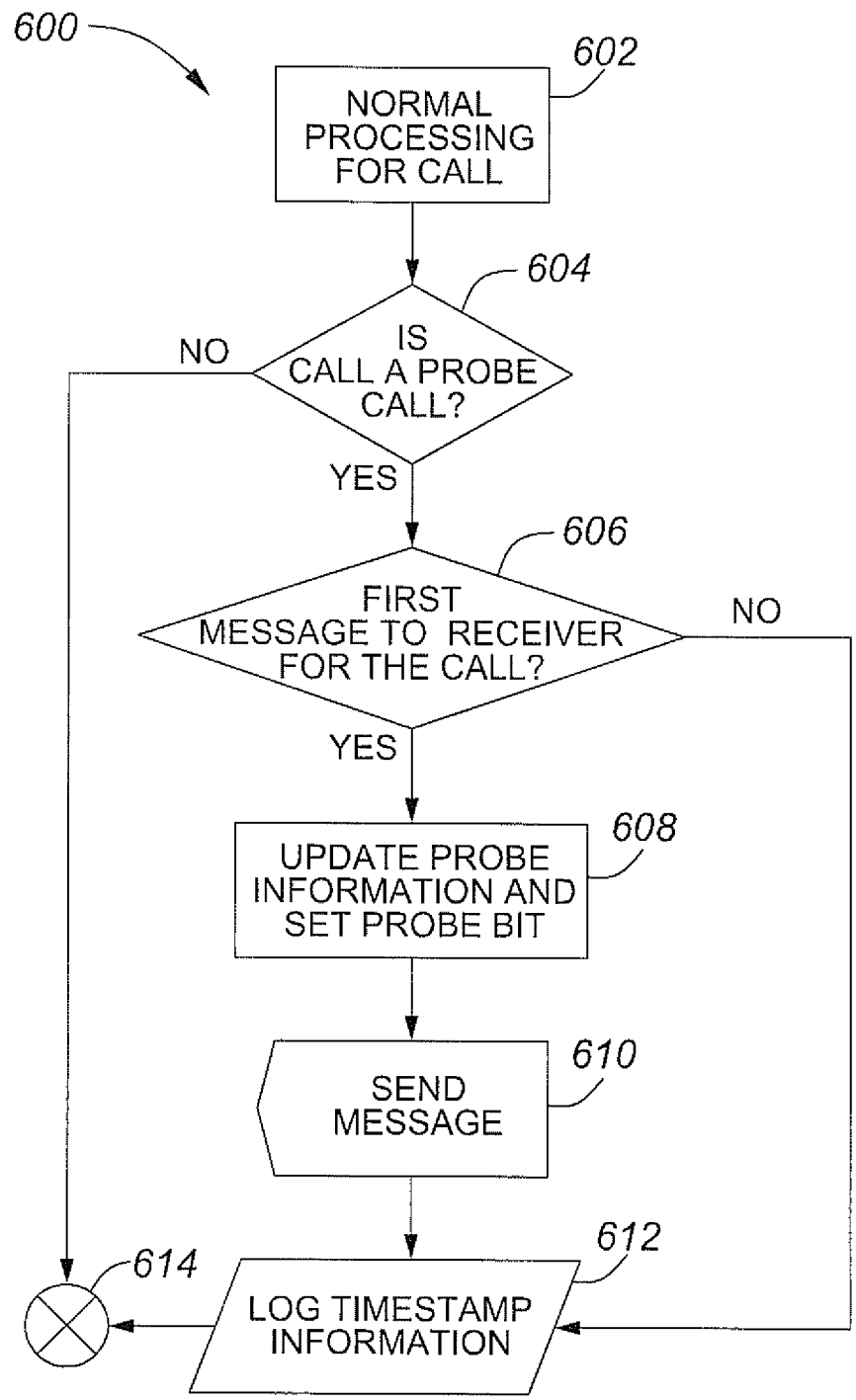
FIGS. 6A, 6B illustrate flow chart of probe session messaging according to a second embodiment of the present invention.

FIG. 6A illustrates a flowchart for transmitting signaling messages from network elements according to a second embodiment of the present invention. As signaling messages are processed for transmission from UE 508, normal call processing takes place (step 602). At step 604, Network Element determines if a signaling message is associated with a probe session or probe call and if not the process ends at step 614. If the signaling message being processed is associated with a probe session or probe call then at step 606, Network Element determines if this signaling message is the first message related to this session or call and if so, at step 608 the Network Element updates the probe information and encodes the outgoing message by setting a probe session bit in the signaling message header. At step 610 the Network Element transmits the message to the destination network element (502, 504, 506) and at step 612 the Network Element logs timestamp information by calculating and then saving or recording the time of transmission of the signaling message. The process then ends at step 614. In this second embodiment of the invention, UE 508 is advised of a probe session by Network Monitoring System 510 via message 512 containing an IMSI associated with a probe session. UE 508 subsequently conveys the probe session information to other network elements via a probe session bit set in the signaling message header. The process for transmitting signaling messages and logging time stamps from other network elements is controlled by a probe session bit.

Figure 6B:
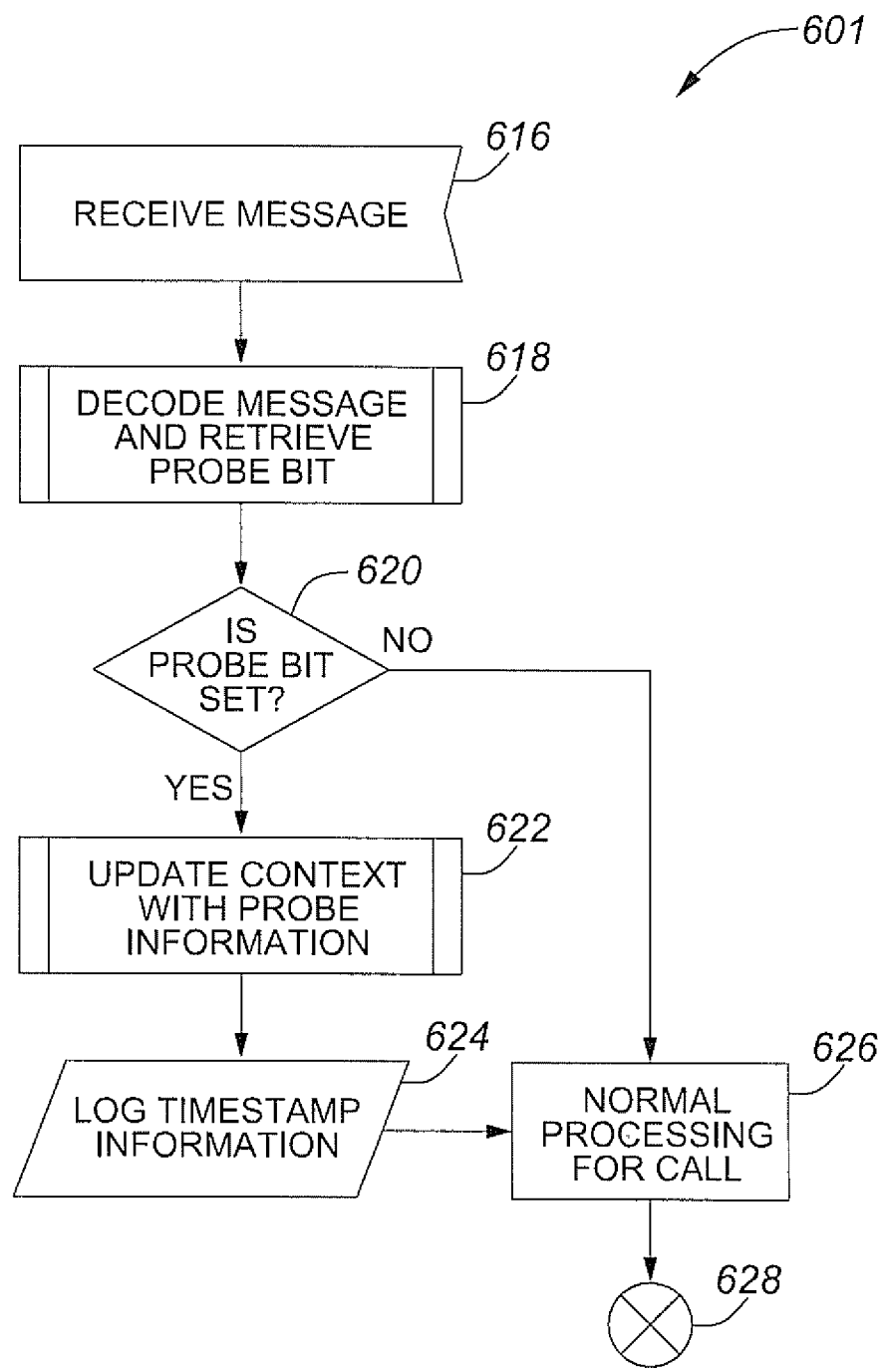

FIG. 6B illustrates a flowchart for receiving signaling messages at a User Equipment 508 according to a second embodiment of the present invention. At step 616, UE 508 receives a signaling message. At step 618 UE 508 decodes the signaling message and retrieves the probe session bit from the message header. At step 620, UE 508 determines if the probe session bit is set and if so, it updates the session context (call context) with the probe information at step 622. At step 624, UE 508 the logs timestamp information by calculating and then saving or recording the time of reception of the signaling message. The process then proceeds to step 626 where normal call processing continues and the process ends at step 628. If the network element determines at step 620 that the bit is not set, the process proceeds to step 626. The process of FIG. 6B also applies to other network elements (502, 504, 506) of network 500.

Note that signaling messages for which a probe session indicator bit is not set will be processed as normal with no time-stamping, thus the time-stamping activity of this embodiment can be activated only as required to minimize overhead cost in CPU usage for the network elements.

The specific bit indicating a probe session can be implemented in various ways including defining a probe session bit at a specific offset from the beginning of the signaling message. This can be defined, for example as a specific bit within the message header of a signaling message, such as using a spare bit that is has heretofore not been defined in a signaling standard. For example, in a UMTS network, RRC, NBAP, RNSAP and RANAP protocols have MSG Code as the message header and then other IE (information elements) depending on the protocol. The probe bit or probe indicator can be part of this header. Advantageously, using a probe session indicator bit at a specific location in a signaling message facilitates a hardware implementation of testing a message for a probe session indicator at a network element and also calculating a timestamp for signaling messages. This in turn reduces CPU usage when compared to a software implementation.

In a third embodiment of the present invention, a probe session indicator bit is used in all signaling messages used in the network in order to simplify implementation.

Figure 7:
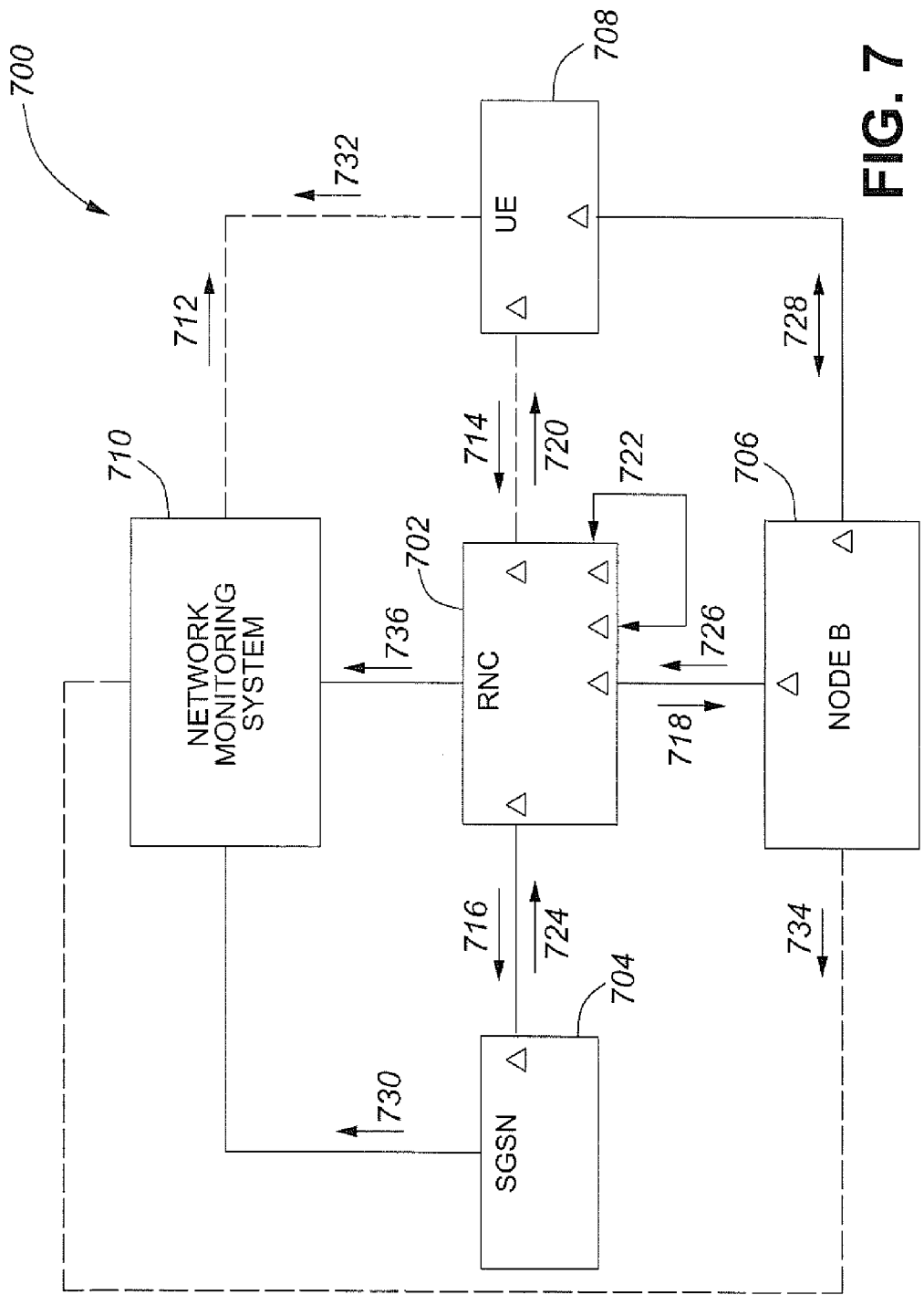
FIG. 7 illustrates probe session messaging in a network according to a third embodiment of the present invention.

With reference to FIG. 7, a network operator through Network Monitoring System 710 instructs UE 708 to enable probing on subsequent session set-ups by transmitting signaling message 712 with a probe session indicator bit set in the header of the signaling message 712.

When UE 708 sends the first message 714 to set up a session such as a call, the UE 708 will check if probe session indicator bit needs to be set and if yes, it sets the probe session indicator bit in the signaling message 714 and sends the message. The probe session indicator bit is then propagated in related messages 716, 718, 720, 722, 724, 726, 728 to and from network elements 702, 704, 706, 708 in network 700. As the signaling messages are received and transmitted by network elements, each network element checks the probe session indicator bit, records a timestamp of the time the message is received or transmitted as well as related information such a session identifier such as the IMSI of the calling UE and updates the call context based on the probe session indicator bit. When the signaling message is forwarded to another network element or if the same message is not forwarded but instead, a related message is sent as part of a session set-up message sequence, the network element retrieves the call context information including the probe session indicator bit value and sets the probe session indicator bit in the outgoing message appropriately and logs the timestamp for the sending the outgoing message along with the associated information for the call or session. The stored timestamps and associated probe session identifiers are subsequently forwarded by each network element as messages 728, 730, 732, 734, 736 to the network monitoring system 710 for further processing.

Figure 8A:
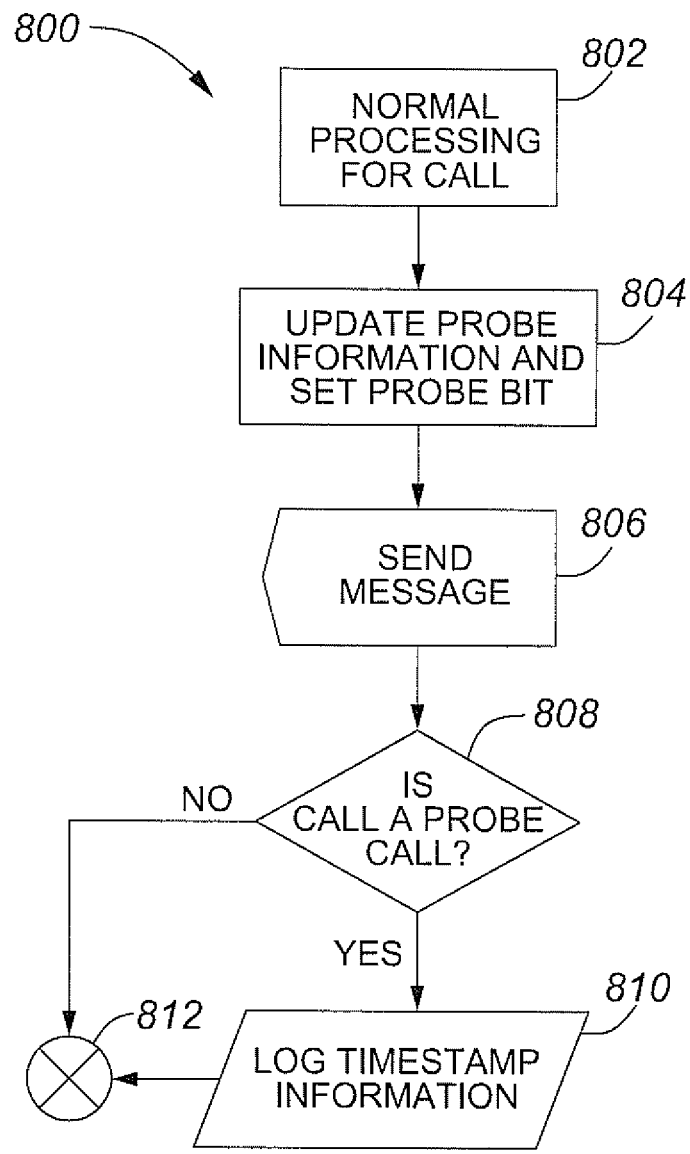
FIGS. 8A, 8B illustrate flow chart of probe session messaging according to a third embodiment of the present invention.

FIG. 8A illustrates a flowchart for transmitting signaling messages from a network element according to a third embodiment of the present invention. As signaling messages are processed for transmission from each of network elements 702, 704, 706, 708, normal call processing takes place (step 802). At step 804 the network element updates the probe information and encodes the outgoing message by setting a probe session bit in the signaling message header. At step 806 the network element transmits the message to a destination network element. A step 808 the network element determines if the session or call is a probe session or call and if so at step 810 the network element logs timestamp information by calculating and then saving or recording the time of transmission of the signaling message. The process then ends at step 812. If at step 808 the network element determines that a probe bit is not set then the process ends at step 812.

Figure 8B:
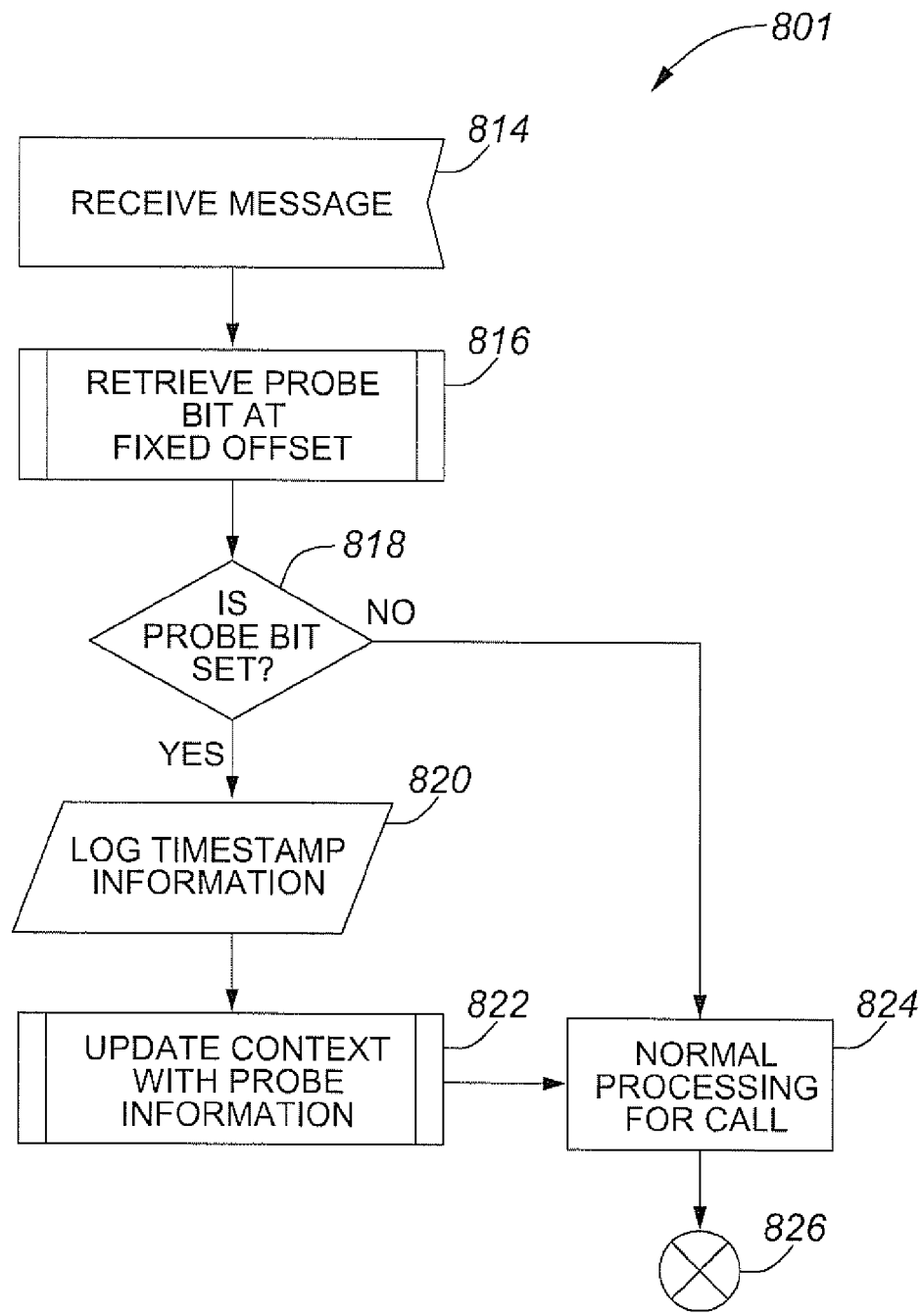

FIG. 8B illustrates a flowchart for receiving signaling messages at each of network elements 702, 704, 706, 708 according to a third embodiment of the present invention. At step 814 the network element receives a signaling message. At step 816 the network element retrieves the probe session bit from the message header. If the probe session bit is implemented at a fixed offset from the start of a signaling message then this step can be easily implemented in hardware as would be appreciated by persons skilled in the art. At step 818, the network element determines if the probe session bit is set and if so, at step 820 it logs timestamp information by calculating and then saving or recording the time of reception of the signaling message. At step 822 the network element updates the session context (call context) with the probe information. The process then proceeds to step 824 where normal call processing continues and the process ends at step 828. If the network element determines at step 818 that the probe bit is not set, the process proceeds to step 824.

As previously discussed with respect to the second embodiment, defining the probe session indicator bit in a message header advantageously enables simplified implementation.

For example, the UMTS standard uses a field for message type (MsgType) in all protocols (e.g. NBAP, RANAP, RNSAP, RRC). To provide backward compatibility for previous UE releases, the most significant bit (MSB) of message type Information Element (IE) can be used. For upcoming UE releases another embodiment can add a probe bit indicator at the start of the message such as for example, a dedicated bit or byte in a message header.

The preceding description describes steps for efficient embodiments for collecting timestamp information at network elements throughout a network, related to a session such as a call or a service. The timestamp information logged at each network element is then forwarded to a network monitoring system for processing and analysis to calculate signaling plane delay KPI information as would be clear to persons skilled in the art.

Note that it is desirable that all network elements are synchronized to a common clock, to be able to accurately determine platform delay from the relative time between timestamps measured at two different network elements.

The timestamps and associated information logged at each network element can be stored in memory at each network element for the duration of the probe session or probe call. A low priority periodic task then sends the logged information to a network monitoring system (NMS) at opportune times, for example when NE is less busy.

Alternatively, the time stamp information for each received and transmitted signaling message can be sent to the network monitoring system as they are logged.

Referring now to an alternative embodiment of the invention which determines network element delay apportionment in round trip delays, for the purposes of the following discussion, User Plane Delay KPIs are those Round Trip Delay KPIs which are sensitive to scheduling of Time to Transmit Interval (TTI), timing adjustments on neighbouring nodes, and changes in time configuration parameters.

In the determination of Round Trip Delay, an end-to-end measurement is concluded once a probe session packet sent by an initiating node is received back at the initiating node after having been looped back at a terminus node, typically a node in the telecommunication system's core.

From an end user perspective, end-to-end delay is a key requirement, however as aforementioned, identification of high latency nodes is required to investigate the root causes and devise solutions for high round trip delay situations.

As previously described, in order to select which messages to monitor, a probe session or probe call is defined. Thus, when a network operator wishes to monitor signaling plane delay in a communication network, the network operator initiates a probe session having a probe session indicator. Signaling plane messages are propagated through various network elements during the regular process of setting up a session. At each of the network elements, the signaling plane messages for this probe session are detected and for these messages only, the time of receiving the message is recorded thereby creating a timestamp, and the time stamp and the associated probe session identifier are logged at the respective network element. The logged timestamps and identifiers are then forwarded to a network management system preferably with an identifier of the network element. The network management system sorts the timestamps and calculates signaling plane delays across each network element. Thus embodiments of the present invention collect and forward timestamp information to a network management system to facilitate the network management system to calculate signaling plane KPIs.

Application layer messages are parsed to determine if they are associated with a probe session indicator and if they are, a time stamp is recorded, capturing the time at which the message is determined to be received at the network element.

In this manner, only a small subset of user plane messages is time-stamped and logged, which minimizes degradation in network performance.

The Round Trip Delay Key Performance Indicator at each node has two parts. The first is the Uplink Delay. This is the packet delay from the User Equipment to last Node which performs the loopback function. The second is the Downlink Delay. This is the packet delay from last or loopback node back to User Equipment.

Figure 9:
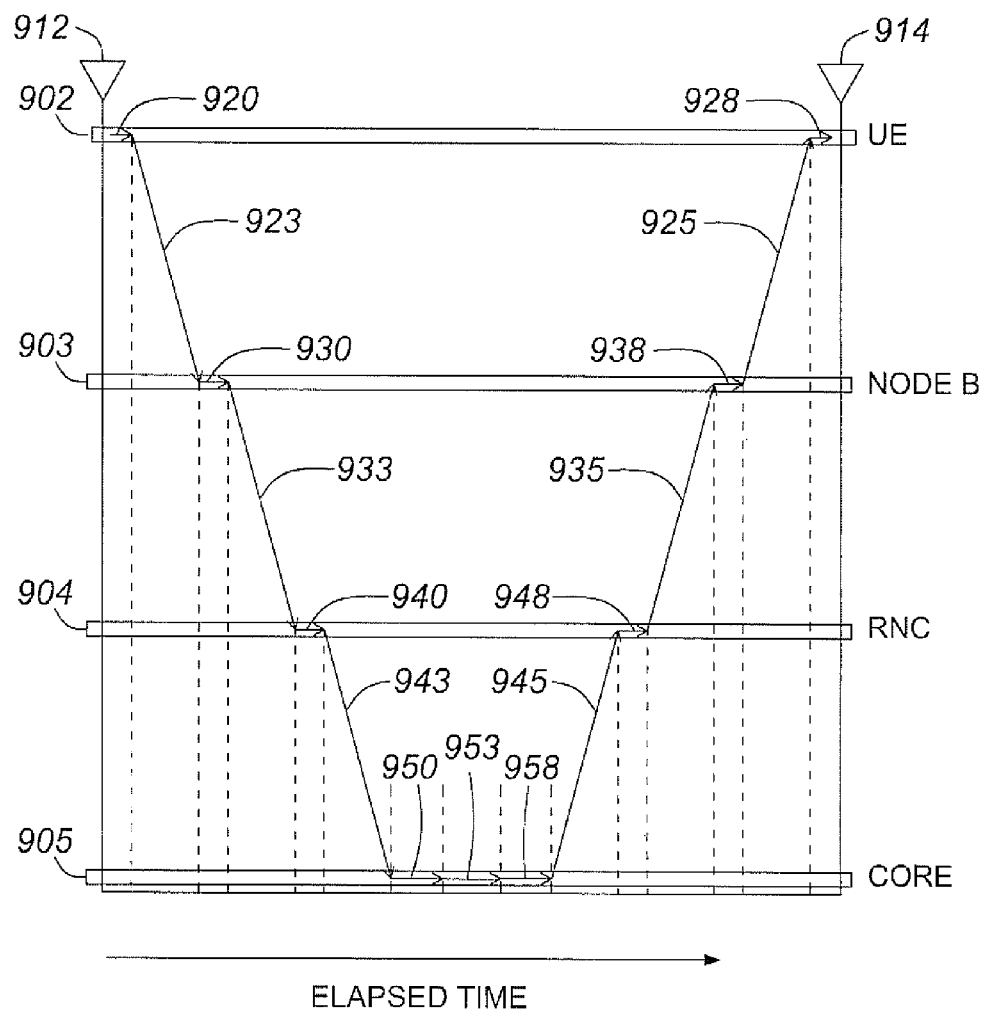
FIG. 9 illustrates a data packet traversing a series of different nodes in a UMTS network (with no segmentation/reassembly between UE & RNC) in accordance with an embodiment of the present invention.
Figure 10:
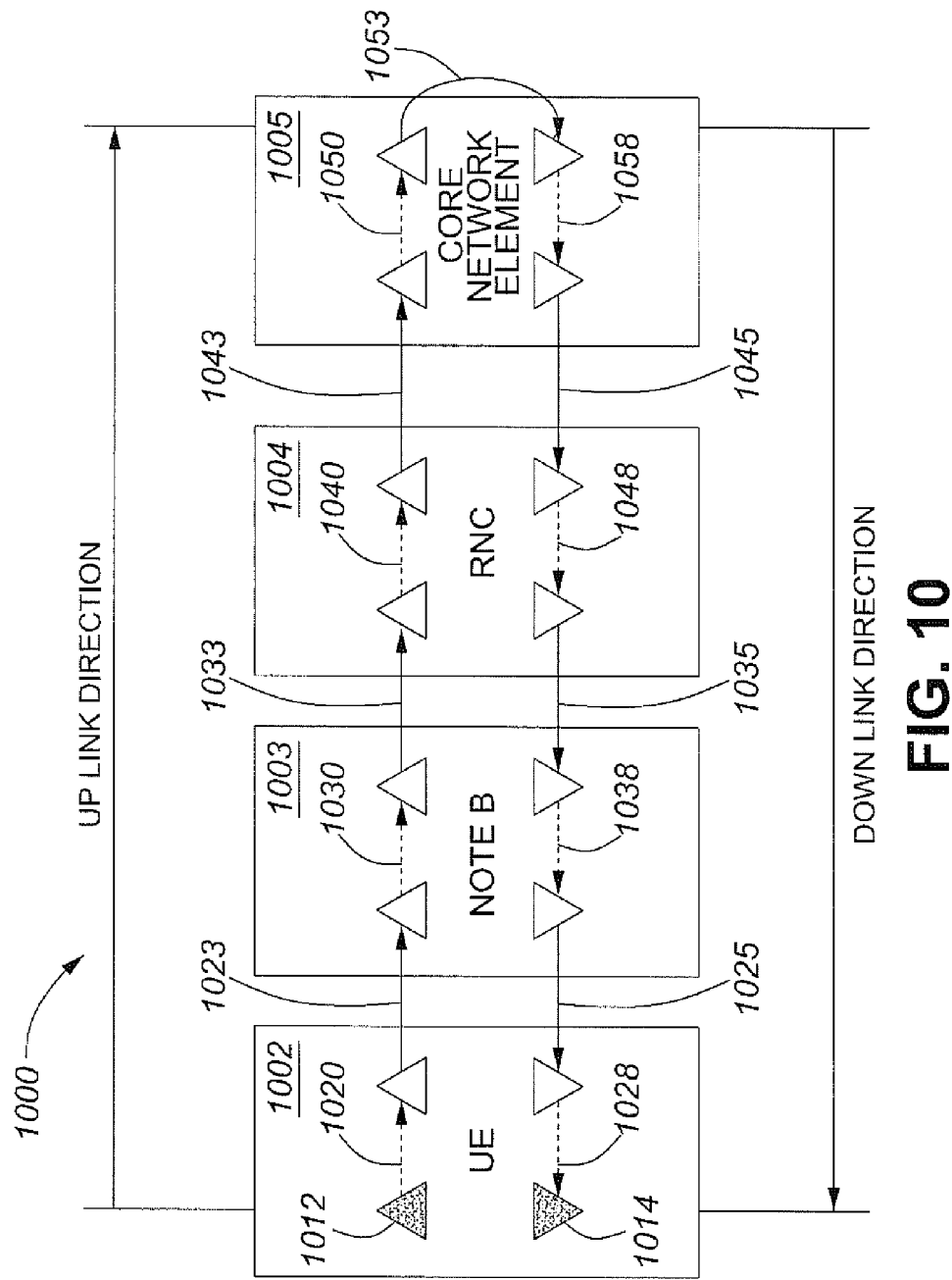
FIG. 10 illustrates a diagram of Round Trip Delay Instrumentation points and delay definitions in accordance with an embodiment of the present invention.

Referring to FIGS. 9 and 10 for an exemplary UMTS network, FIGS. 9 and 10 illustrate nodal delays wherein FIG. 9 illustrates the path of a message on a time based grid and FIG. 10 illustrates the message path across a set of figurative network elements. In FIG. 10 the Δ and ∇ symbols represent the points at which timestamps are taken. In FIGS. 9 and 10, similar delay elements have similar reference numbers. Note that FIG. 9 illustrates the delay contribution of a data packet with single IUB FP frame (no Segmentation) in different node. In the case of delay contribution with segmentation and reassembly function the operation of the network functions as a store and forward operation and therefore all other delays stay the same.

Round Trip Delay (RID) KPI Instrumentation Points

In order to measured the Round Trip Delay KPI as described above, a loopback node is specified, a probe session packet loopback is initiated, and a record of the timestamp at reception of the packet and sending of the packet for each node is made.

Referring to FIG. 9 the process can be followed where a probe session loopback packet can be followed as it progresses from User Equipment 902, to NodeB 903, to RNC 904 to Core Network Element 905 where it is looped back to RNC 904, thence to NodeB 903 and finally back to User Equipment 902. In terms of timing, the loopback packet is initiated in the uplink direction at time point 912 where it incurs a User Equipment 902 node delay 920 and then crosses a network connection to the NodeB 903 incurring a delay 923. At NodeB 903 the packet incurs a node delay 930 and then crosses a network connection to the RNC 904 incurring a delay 933. At the RNC 904 the packet incurs a node delay 940 and then crosses a network connection to a Core network element 905 incurring a delay 943. At the Core the pack incurs a first node delay 950, then a loopback delay 953 (presuming a hardware loopback mechanism is used) and then a second node delay 958 in the downlink direction. Note—in some embodiments the loopback is effected via software and the loopback delay 953 and/or the second node delay 958 may be non-existent.

Having been looped back, the packet now proceeds along the downlink pack incurring a delay 945 in crossing the network connection from the Core 905 to RNC 904. At RNC 904 the packet incurs a node delay 948. In crossing the network connection from RNC 904 to NodeB 903 the packet incurs a delay 935. At NodeB 903 the packet incurs a node delay 938. In crossing the network connection from NodeB 903 to User Equipment 903 a delay 925 is incurred. Finally, at User Equipment 903 a final node delay 928 is incurred before the packet is recognized and the Round Trip is completed at time point 914.

As previously described, loopback can be effected via a software loopback or a physically connected cable depending on the test environment for the Round Trip Delay KPI. For software loopback, the probe session message indication, e.g. IMSI or probe bit, can be use to order a loopback of the packet at the Core node 905.

Referring now to FIG. 10 there may be seen a block diagram containing the network elements reference in the timing diagram of FIG. 9. In FIG. 10 the Δ and ∇ symbols represent the points at which timestamps are taken. In FIG. 10 the reference numbers for the delay segments correspond to similar delay reference numbers in FIG. 9.

Thus, the loopback packet is initiated at 1012 and a timestamp is taken. Prior to exiting the UE 1002 a second timestamp is taken allowing the UE node delay 1020 to ultimately be determined by calculating the difference between the timestamps. As the packet enters and exits each node a timestamp is taken and stored. Thus, the delay in crossing the network connections, for example delay 1023 corresponding to crossing delay 923 of FIG. 9 can be calculated by determining the difference between the entry timestamp at NodeB 1003 and the exit timestamp at UE 1002. Thus crossing delays 1023, 1033, and 1043 in the uplink direction, and crossing delays 1045, 1035, and 1025 in the downlink direction, and loopback delay 1053 can be calculated. Note that loopback delay 1053 is representative of the case where the packet is looped back such that it crosses both the uplink egress buffer and the downlink ingress buffer of the Core network element 1005. Should software loopback mechanism be employed, then there would be a time delay calculable between the timestamp at the uplink ingress buffer and the downlink egress buffer. Similarly, node delays 1020, 1030, 1040, and 1050 in the uplink direction, and node delays 1058, 1048, 1038, and 1028 in the downlink direction can be calculated.

Probe Session Setup or Identification

A probe session can be setup using the techniques as illustrated in the description of FIGS. 4, 6, and 8. However probe sessions for Round Trip Delay measurements can take advantage of simpler requirements than Signaling Plane KPIs. Signaling Plane KPIs can make use of any real time user call for KPI tracking, while for Round Trip Delay KPI, a test probe call with fewer packets is preferred. As the data path for real users may be CPU intensive, recording the timestamps for each data packet for probe session can degrade system performance. As only one packet is needed to compute the Round Trip Delay KPI with different packet sizes.

According to another contemplated embodiment, a probe session indicator modified ICMP Ping packet can be used as the measurement triggering packet as it has a software loopback at the application layer.

Round Trip Delay KPI Information Collection

All send and receive time stamps are recorded at each traversed network element. As previously described, the recorded time stamps can then be sent for processing to Network Monitoring Center or to a local call trace function.

Accordingly, what has been disclosed is a method and process for determining a Round Trip Delay KPI. The method provides the capability of measuring round trip delay and apportioning latency among network elements contributing to the round trip delay.

Note, in the preceding discussion a person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Numerous modifications, variations and adaptations may be made to the embodiment of the invention described above without departing from the scope of the invention, which is defined in the claims.

What is claimed is:

1. A method for apportioning delays of a plurality of network elements on a round trip path in a network, said method comprising the steps of:
   Transmitting, at a user element, a loopback packet having a probe session indicator along said round trip path,
      wherein said roundtrip path reaches a core network element, and
      wherein the loopback packet is received at said user element after completing said roundtrip path;
   determining at each of said plurality of network elements on said round trip path the presence of said probe session indicator, and
   responsive to the presence of said probe session indicator, logging a first timestamp corresponding to the time of receipt of said loopback message, and a second timestamp corresponding to the time of retransmission of said loopback message; and
   transmitting at each of said plurality of network elements said first and second timestamps to a network management system.

2. A method for apportioning delays as claimed in claim 1 wherein said determining the presence of said probe session indicator is determined in an application layer of said network element.

3. A method for apportioning delays as claimed in claim 2 wherein said indicator comprises an International Mobile Subscriber Identity (IMSI) identifying a probe session.

4. A method for apportioning delays as claimed in claim 2 wherein said probe session indicator comprises a probe bit identifying a probe session.

5. A method for apportioning delays as claimed in claim 4 wherein
   said probe bit comprises a bit in a message header of said loopback message.

6. A method for apportioning delays as claimed in claim 1 wherein
   said loopback message comprises a modified Internet Control Message Protocol (ICMP) PING message, and
   wherein said loopback message has identical uplink and downlink paths.

7. A method performed by an intermediate network device, the method comprising:
   receiving, at the intermediate network device, a message having a probe session indicator,
      wherein the message is a loopback message having an uplink path originating from a user element that reaches a network core element and a downlink path returning the loopback message to the user element;
   determining that the message includes the probe session indicator;
   based on the message including the probe session indicator:
      generating a first timestamp corresponding to a time of receipt of the message;
      generating a second timestamp corresponding to a time of transmission of the message, and
      transmitting the first timestamp and the second timestamp to a first device; and
   transmitting the message to a second device.

8. The method of claim 7, wherein said loopback message traverses the same intermediate nodes on the uplink path and downlink path.

9. The method of claim 7, wherein the first device is a network management system.

10. The method of claim 7, wherein determining that the message includes the probe session indicator is performed at an application layer of the intermediate network device.

11. The method of claim 7, wherein the probe session indicator comprises an International Mobile Subscriber Identity (IMSI) identifying a probe session.

12. The method of claim 7, wherein the probe session indicator comprises a probe bit identifying a probe session.

13. The method of claim 7, wherein the message comprises a modified Internet Control Message Protocol (ICMP) PING message.

14. An intermediate network device comprising:
a memory device; and
a processor in communication with the memory device, the processor being configured to:
receive a message having a probe session indicator, wherein the message is a loopback message having an uplink path originating from a user element that reaches a network core element and a downlink path returning the loopback message to the user element;
determine that the message includes the probe session indicator;
based on the message including the probe session indicator:
generate a first timestamp corresponding to a time of receipt of the message;
generate a second timestamp corresponding to a time of transmission of the message, and
transmit the first timestamp and the second timestamp to a first device; and
transmit the message to a second device.

15. The intermediate network device of claim 14, wherein said loopback message traverses the same intermediate nodes on the uplink path and downlink path.

16. The intermediate network device of claim 14, wherein the first device is a network management system.

17. The intermediate network device of claim 14, wherein determining that the message includes the probe session indicator is performed by the processor at an application layer of the intermediate network device.

18. The intermediate network device of claim 14, wherein the probe session indicator comprises an International Mobile Subscriber Identity (IMSI) identifying a probe session.

19. The intermediate network device of claim 14, wherein the probe session indicator comprises a probe bit identifying a probe session.

20. The intermediate network device of claim 14, wherein the message comprises a modified Internet Control Message Protocol (ICMP) PING message.

* * * * *